Figure 1:
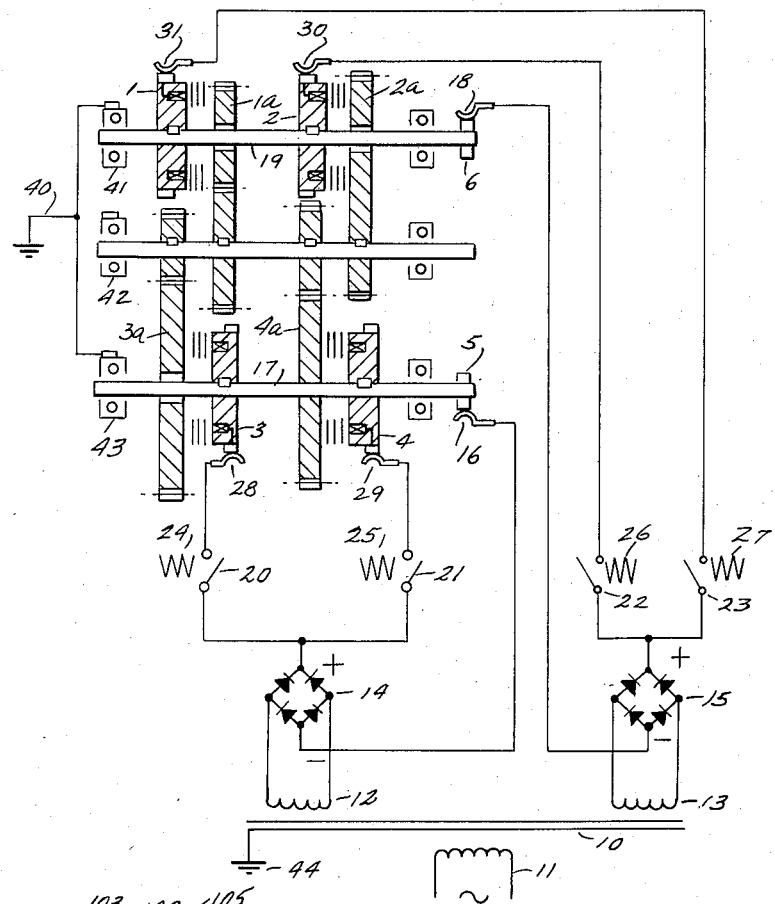

April 28, 1959  E. J. DIEBOLD  2,883,873

POWER SUPPLY CIRCUIT FOR ELECTROMAGNETIC CLUTCHES

Filed Jan. 3, 1955

INVENTOR.
EDWARD J. DIEBOLD

BY *Ostrolenk, Faber, Gerb & Soffen*
ATTORNEYS

United States Patent Office 2,883,873
Patented Apr. 28, 1959

2,883,873

POWER SUPPLY CIRCUIT FOR ELECTROMAGNETIC CLUTCHES

Edward John Diebold, Ardmore, Pa., assignor to I-T-E Circuit Breaker Company, Philadelphia, Pa., a corporation of Pennsylvania Application January 3, 1955, Serial No. 479,415

4 Claims. (Cl. 74—365)

My invention relates to a power supply circuit for electromagnetic clutches and is more particularly directed to a circuit that will eliminate current through the ballbearings of a shaft supporting the electromagnetic clutch.

Electromagnetic clutches of the type dealt with by my invention are disclosed in U.S. Patents 2,254,625 issued September 2, 1941, 2,344,111 issued March 14, 1944, 2,378,108 issued June 12, 1945 and 2,387,613 issued October 23, 1945.

The electromagnetic clutches shown in these patents consist in general of an operating coil embedded in a magnetic body and the magnetic body is usually splined to a shaft in a machine. The magnetic body acts on laminations which are alternately splined either with the body itself or with a movable gear. When an operating coil embedded in the magnetic body is energized, the laminations are attracted to each other and adhere firmly, thereby attaching the two splines to each other. Hence the gear is attached to the magnetic body and will revolve with the shaft.

The operating coil has one lead attached to a slip ring which is concentric to the magnetic body and a second lead fastened to the shaft of the machine. It should be noted that only one slip ring is used since the use of two slip rings, that is, one for the start of the coil and one for the finish of the coil would require additional space.

By using this clutch which is very small and very light, substantial power can be clutched in and out as many times as is desired and long gear trains with many gears can be obtained. For instance, nine speeds can be obtained with six clutches, twenty-six speeds with nine clutches, and eighty-one speeds with twelve clutches.

In order to obtain such a high number of speeds or to obtain forward and reverse speeds or to obtain special drives with several output shafts, it is common practice to have the clutches operating from several shafts. For instance, if twelve clutches are used to obtain eighty-one different speeds, it is normal practice to use four main shafts bearing three clutches each, and three drive transmitting shafts in between bearing gears only.

In such a multiple shaft clutch drive system, it has been the practice to energize the operating coils from a grounded D.C. power source. The complete energizing circuit comprises in series, the D.C. power source, a brush engaging the clutch slip ring, the shaft bearing the clutch, the bearing on which the shaft is mounted, the machine ground and back to a ground on the D.C. power source. This common way in which clutches are energized today has the severe disadvantage that all the current through the clutch operating coils must flow through the bearings in the machine to get to the machine ground.

However, it is well known that ball bearings are made for fluid lubrication and are designed in such a way that the balls never actually touch races of the bearings. It is this property of the ball bearings which permits them to last for many years even under hard service. If, however, current must be transmitted through the bearing, this current must penetrate the thin oil film, hence putting the ball and the race in direct electrical contact. This electrical contact corresponds to a very small electric arc or what is worse, to a minute weld. The disturbance of the surface in the ball and in the race is not only a damage of the surface at this point, but from the moment it is created, it will keep on damaging the remaining surface of the bearing because it is now rough rather than being perfectly polished as before. The accumulative effect of this roughness and the continuous damage done to the bearing lead to a shorter lifetime of the balls in he bearing to thereby make the gear drive unworkable after a very short time due to bearing failure.

An attempt has been made to overcome this disadvantage by shorting out the bearing with a brush that connects the shaft to ground. This, however, was not sufficient since the substantial voltage drop on the short circuiting brush still allows current flow through the bearing. An even worse condition occurs if the short-circuiting brush bounces since the sudden rise in voltage across the bearing will cause arcing.

The principle of my invention lies in a circuit in which the D.C. power source which energizes the electromagnetic clutch operating coils is isolated from ground and the return power from the electromagnetic clutch is taken from a slip ring and a brush on the shaft containing the clutch.

In a clutch arrangement using a plurality of shafts, I provide a separate energizing circuit for the clutches on each shaft. Without this type arrangement, the voltage drop across the brushes will be impressed across the ball bearings since each shaft is grounded through the machine ground, thereby necessitating an isolated power source for each shaft. Therefore, my novel circuit eliminates the ballbearing from the current path without resorting to a second slip ring on the electromagnetic clutch body.

Since considerable machining is required for shafts which are to receive electromagnetic clutches, the addition of a slip ring is a relatively minor item. In fact, it is an advantage to have the additional slip ring on a shaft rather than on the clutch since the shaft has a smaller diameter and the velocity between the brush and slip ring will be lower, thereby giving longer brush life.

This circuit has met with considerable commercial success as the solution to the long-existing problem of ballbearing current in machines using electromagnetic clutches.

Accordingly, it is a primary object of my invention to provide an energizing circuit for electromagnetic clutches which eliminates current through the shaft bearings.

Another object of my invention is to provide a separate energizing circuit for the electromagnetic clutch on each shaft of a machine having a plurality of shafts.

Another object of my invention is to provide an energizing circuit for electromagnetic switch operating coils in which the D.C. source is isolated from the ground potential of the machine containing the electromagnetic clutches.

A further object of my invention is to provide a circuit which has a return current path for the D.C. source which comprises a slip ring and a brush on the shaft of the electromagnetic clutch.

These and other objects of my invention will become apparent when taken in connection with the drawings in which:

Figure 1 schematically illustrates the circuit connection of a plurality of electromagnetic clutch operating coils which are contained on different bearing mounted shafts.

Figure 2:
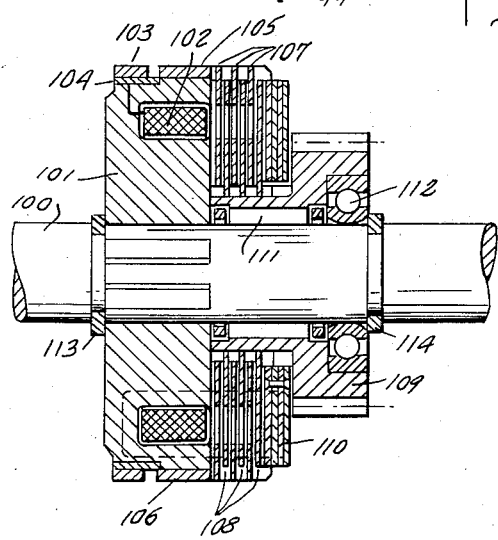

Figure 2 illustrates a side cross-sectional view of a typical clutch and engageable drive means therefor which could be utilized in the embodiment of Figure 1.

In Figure 1, I show an example of a system of electromagnetic clutches. Although the figure shows a device having four electromagnetic clutches, it should be noted that the choice was arbitrary and my circuit has universal application with reference to the energization of electromagnetic clutches.

The construction of the electromagnetic clutches and their selectively driven power transmitting elements is shown in Figure 2 and is the type of clutch described in previously mentioned U. S. Patent No. 2,344,111 issued March 14, 1944.

In Figure 2, a shaft 100 has a magnetic clutch body 101 keyed thereto by the gear type spline as seen in the figure. Clutch body 101 carries an operating winding 102 therein which has one of its ends electrically connected to slip ring 103 which is carried by body 101 and is insulated therefrom by insulating ring 104. Magnetic body 101 further carries a plurality of non-magnetic claws such as claws 105 and 106 which axially project from the body 101 to engage magnetic discs such as discs 107. Interposed between each of discs 107 are the inner discs 108 which are normally in non-torque transmitting relationship with respect to discs 107, all of discs 107 and 108 being axially movable with respect to clutch body 101. The inner discs 108 are carried by a spline in the sleeve portion extending to the left of gear member 109 while an axially movable armature 110 is carried by the same sleeve portion, but is rotatable with respect to gear 109. Gear 109 is then rotatably mounted with respect to shaft 100 by needle bearings 111 and ball bearings 112. The complete clutch is then held in a fixed axial position with respect to shaft 100 by retaining rings 113 and 114.

In operation, the winding 102 has one end electrically connected to shaft 100 as by connecting one end to the magnet body 101 or by a direct connection. Coil 102 is then energized by connecting a potential between slip ring 103 and shaft 100 so that a magnetic flux is set up as indicated by dotted lines in Figure 2 to cause armature 110 to compress the lamination stack formed by laminations 107 and 108 tightly together and thus cause magnet body 101 and gear 109 to rotate as a single member.

The system of Figure 1 shows four electromagnetic clutches 1, 2, 3 and 4 respectively. Electromagnetic clutches 1 and 2 are splined to shaft 19 and clutches 3 and 4 are splined to shaft 17. It is to be understood that electromagnetic clutches 1, 2, 3 and 4 may be identical to the clutch set forth in Figure 2. The clutches 1, 2, 3 and 4 of Figure 1 are schematically illustrated to have gears 1a, 2a, 3a and 4a respectively associated therewith in the same manner that gear 109 is associated with the clutch in Figure 2. However, since the emphasis in Figure 1 is on the electrical circuitry, the specific clutch structure has been omitted. The power to operate clutches 1, 2, 3 and 4 is supplied from transformer 10 which has a primary winding 11 and two isolated secondary windings 12 and 13. The power of secondary winding 12 is rectified in rectifier 14 and the power in secondary winding 13 is rectified in rectifier 15.

Note that the negative terminal of rectifiers 14 and 15 are not grounded as is the practice in prior art arrangements, and a completely isolated power source is provided for each of shafts 17 and 19. The negative terminal of rectifier 14 is connected to the return brush 16 and slip ring 5 on shaft 17. The negative terminal of the rectifier 15 is connected to shaft 19 through the return brush 18 and slip ring 6.

The positive terminal of rectifier 14 is connected to relay contacts 20 and 21 whereas the positive terminal of rectifier 15 is connected to the relay contacts 22 and 23. Relay contacts 20, 21, 22 and 23 are selectively operated by coils 24, 25, 26 and 27 respectively. The operating circuits for these relays are not shown as they are old and well known. Each of relay contacts 20, 21, 22 and 23 is connected in series to a brush 28, 29, 30 and 31 respectively, which leads the energizing current through a slip ring on the electromagnetic clutch to thereby energize clutch 1, 2, 3 or 4 respectively.

The circuit operation is as follows: If relay contact 20 is closed, current generated in the transformer secondary 12 is rectified in rectifier 14, flows through closed contact 20, brush 28, the operating coil of clutch 3, shaft 17, slip ring 5, brush 16 and back to the negative terminal of rectifier 14. It is important to note that since rectifier 14 is not grounded, the current does not flow out through bearing 43 and machine ground 40. That is, bearing current is eliminated by isolating the D.C. source which energizes the clutch operating coils. Similarly, on engagement of relay contact 22 or 23, a clutch on shaft 19 would be energized from rectifier 15 through either of the brushes 30 or 31, the operating coils of clutches 1 or 2, shaft 19, slip ring 6, return brush 18 and the negative ungrounded terminal of rectifier 15. Here once again, no current flows through bearing 41 to the machine ground 40 since a return path to rectifier 15 is not provided.

In the above-described embodiment, it should be noted that if any of the brushes for the current return, that is, brushes 16 or 18 should bounce, the current will be completely interrupted, and since there is no return path through the bearings, the bearings will not carry current. If two isolated power sources were not used, and a brush jumped, then the bearing would have to carry the full current due to the full circuit voltage appearing on the open circuited brush.

Furthermore, the absence of grounding in the circuit is not dangerous to personnel because the current-carrying shaft is grounded through the bearings, thereby discharging static electricity generated in the machine. The machine bearings, however, are not affected by the current due to the static electricity since this current is only on the order of microamperes, whereas clutch current could be of the magnitude of one ampere.

In the foregoing, I have described a specific embodiment of my invention. However, many variations and modifications will now become apparent to those skilled in the art, and I therefore wish to be limited, not by the specific disclosures herein, but only by the appended claims.

I claim:

1. In a device having a plurality of shafts supported by bearings; at least two of said plurality of shafts having electromagnetic clutches mounted thereon, the remainder of said plurality of shafts having drive transmitting means mounted thereon to transmit power between said two of said shafts having electromagnetic clutches mounted thereon; each of said electromagnetic clutches comprising a clutch body, an operating coil, an engageable drive means and a slip ring; said slip ring of said electromagnetic clutches being electrically connected to one end of its respective operating winding, the other end of said operating winding of each of said electromagnetic clutches being electrically connected to their respective shafts; each of said two shafts carrying electromagnetic clutches including a slip ring electrically connected thereto; a first and second energizing circuit for the operating windings of said electromagnetic clutches of said two shafts respectively; said first and second energizing circuits including a first and second D.-C. source electrically isolated from one another; each of said energizing circuits forming a series circuit for each of the said operating windings of the electromagnetic clutches of their respective shaft of said two shafts; each of said series circuits including the respective one of said D.-C. sources, a switching means, a first brush, one of said slip rings carried by the clutch body carrying said operating winding, said operating winding, said shaft carrying said clutch body, said slip ring conductively connected to said shaft, a second brush and back to said respective one of said D.-C. sources.

2. In a device having a first and second plurality of bearing mounted shafts; said first plurality of shafts having electromagnetic clutches mounted thereon; each of said electromagnetic clutches having a clutch body, an operating winding, an engageable drive means, and a first slip ring; each of said first slip rings being mounted on their respective clutch bodies and insulated therefrom; each of said first slip rings being electrically connected to one end of said operating winding of their respective electrical magnetic clutch, the other end of said operating windings being electrically connected to their respective shaft of said first plurality of shafts; each of said first and second plurality of shafts being positioned with respect to one another so that any electromagnetic clutch engageable drive means of said first plurality of shafts can transmit mechanical power to any of said second plurality of shafts and the remainder of said first plurality of shafts having a second slip ring electrically connected thereto and carried thereby; an energizing circuit incapable of passing current through the bearings of said shafts for energizing the said operating windings of each of said electrical magnetic clutches; said energizing circuit comprising a plurality of closed series connections for each of said operating windings; each of said closed series connections comprising a D.-C. source, a switching means, a first brush, one of said first slip rings, a respective one of said operating windings, said shaft having said respective operating windings associated therewith, said second slip ring of said last mentioned shaft, a second brush, and back to said D.-C. source.

3. A circuit for energizing an electromagnetic clutch, said electromagnetic clutch comprising a clutch body, an operating winding and a first slip ring; said first slip ring being carried by said clutch body and being electrically insulated therefrom; said first slip ring being electrically connected to one end of said operating winding; a bearing mounted shaft having said electromagnetic clutch mounted thereon; the other end of said operating winding being electrically connected to said bearing mounted shaft; said bearing mounted shaft having a second slip ring mounted thereon and electrically connected thereto; said energizing circuit being constructed to be incapable of passing current through the shaft bearings and forming a closed series connection comprising a D.-C. source; a switch means, a first brush, said first slip ring, said operating coil, said bearing mounted shaft, said second slip ring, a second brush, and back to said D.-C. source.

4. In a machine having electromagnetic clutches; each of said electromagnetic clutches having a clutch body, an operating winding and a first slip ring; said first slip ring being mounted on said clutch body and being electrically insulated therefrom; said first slip ring being electrically connected to one end of said operating winding; said machine having bearing mounted shafts with said electromagnetic clutches mounted thereon; the opposite end of each of said operating windings being electrically connected to their respective bearing mounted shafts, each of said bearing mounted shafts having a second slip ring mounted thereon and electrically connected thereto; an energizing circuit for energizing each of said operating windings; said energizing circuit comprising a plurality of closed series connected circuits, each of said closed series circuits being comprised of a D.-C. source, a first brush, one of said first slip rings, a respective operating winding, said shaft carrying said respective operating winding, said second slip ring carried by said respective shaft, a second brush, and back to said D.-C. source; said D.-C. source being electrically isolated from said machine carrying said bearing mounted shafts.

References Cited in the file of this patent

UNITED STATES PATENTS

| | | |
|---|---|---|
| 654,632 | Heilman | July 31, 1900 |
| 808,226 | Anderson | Dec. 26, 1905 |
| 944,497 | Pearson et al. | Dec. 28, 1909 |
| 1,601,001 | Sleeper | Sept. 28, 1926 |
| 2,519,449 | Findley | Aug. 22, 1950 |
| 2,573,152 | Leifer | Oct. 30, 1951 |
| 2,591,989 | Winther | Apr. 8, 1952 |

FOREIGN PATENTS

| | | |
|---|---|---|
| 6,246 | Great Britain | 1892 |
| 334,829 | Great Britain | Sept. 11, 1930 |